Aug. 20, 1940.  O. E. WAGENKNECHT  2,211,994
AUTOMOBILE RADIO RECEIVER
Filed Oct. 1, 1938   3 Sheets-Sheet 1

Inventor:
Otto E. Wagenknecht
By J. Clarke Hagey
Atty.

Aug. 20, 1940.   O. E. WAGENKNECHT   2,211,994
AUTOMOBILE RADIO RECEIVER
Filed Oct. 1, 1938   3 Sheets-Sheet 2

Inventor:
Otto E. Wagenknecht
By J. Clarke Hagey
Atty.

Aug. 20, 1940.    O. E. WAGENKNECHT    2,211,994
AUTOMOBILE RADIO RECEIVER
Filed Oct. 1, 1938    3 Sheets-Sheet 3
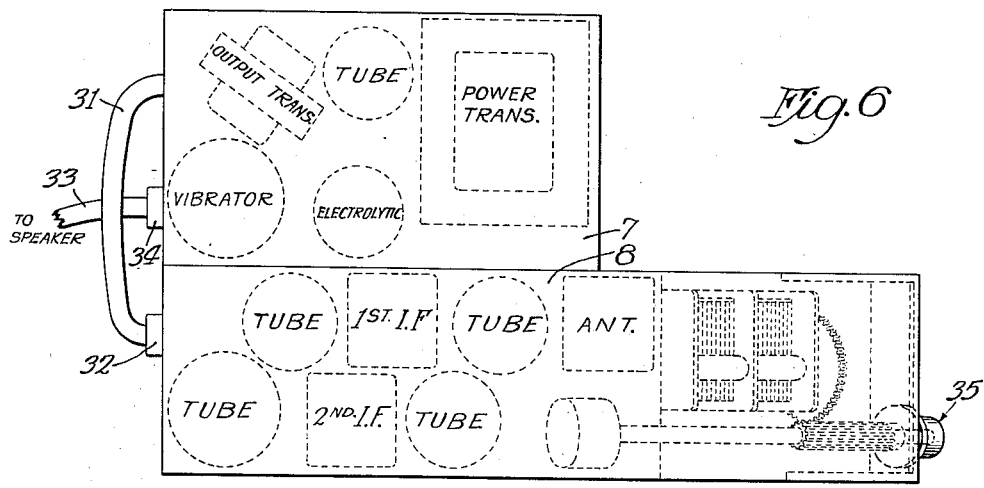
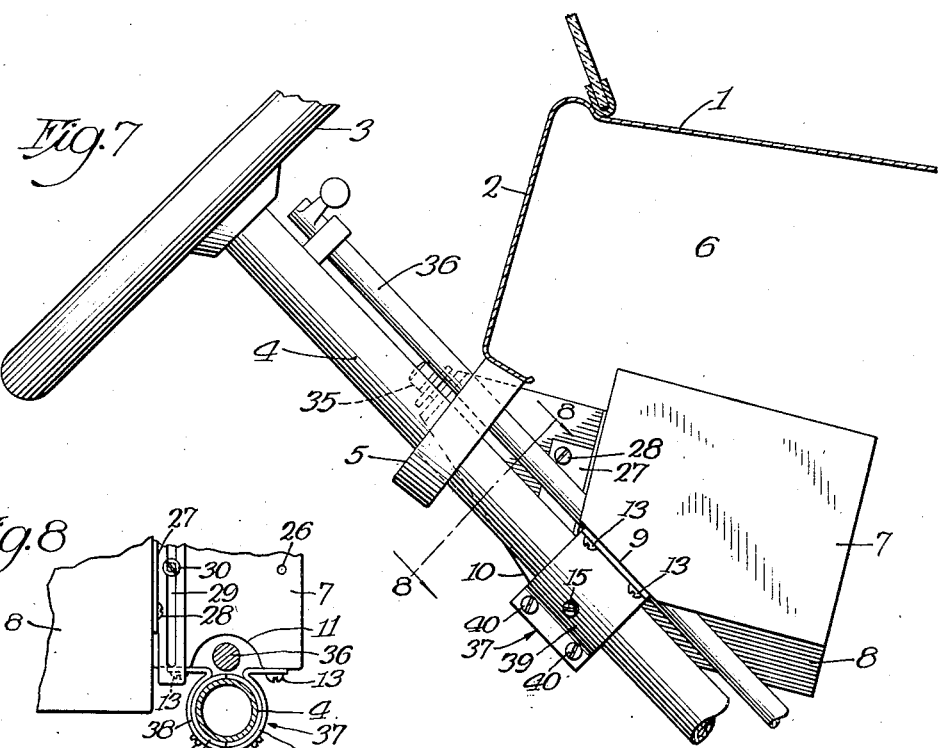
Inventor:
Otto E. Wagenknecht
By J. Clarke Hagey
Atty.

Patented Aug. 20, 1940

2,211,994

UNITED STATES PATENT OFFICE 2,211,994

AUTOMOBILE RADIO RECEIVER

Otto E. Wagenknecht, Chicago, Ill., assignor to Zenith Radio Corporation, Chicago, Ill., a corporation of Illinois Application October 1, 1938, Serial No. 232,786

4 Claims. (Cl. 250—14)

This invention relates to radio receiving sets designed for installation in automobiles, and more specifically to the grouping of various elements of the radio apparatus in separately encased units, to the shape and association of such units, and to the provision of means for adjustably supporting the units to facilitate convenient installation and removal thereof.

The principal objects of the invention are to provide for the convenient installation of the radio apparatus in different makes of automobiles without cutting away or drilling, or marring the finish thereof, and without changing the arrangement of any of the controlling or indicating devices of the automobile; to provide for the placement of the different units of the apparatus in desired positions to present a neat and finished appearance and to suit the convenience and comfort of the operator, so that access may be had to said units for operation, inspection and repair, and so that the positions thereof will not hamper the operation of the automobile control devices; and particularly to provide a construction so designed that the entire radio apparatus may be readily removed from one automobile and as readily installed and conveniently arranged in another car of the same or different make.

While radio apparatus for automobiles has heretofore been constructed in separately encased units to permit individual arrangement of the different units where space could be found, each installation of the radio apparatus presented its own difficulties in positioning the units where they would be reasonably accessible and at the same time not interfere with the proper and safe operation of the automobile controls, and where they could be operatively connected together to the best advantage. The resultant disorder and disfiguring of the interiors of the cars induced automobile manufacturers to provide space and arrange the intsrument panels of the cars to accommodate radio apparatus and control devices, but such provisions and arrangements have not been standardized and have not been wholly satisfactory, since it has been necessary to specially construct the radio apparatus to occupy the space provided, and apparatus constructed for installation in the space provided in one make of car is not suitable for installation in cars of different manufacture.

The hereinbefore mentioned objects are attained and the described difficulties are overcome in the present invention by so shaping, combining and adjustably supporting the major units of the radio apparatus as to provide a compact, universally adaptable receiving set prepared and ready for convenient installation and suitable arrangement in different makes of automobiles. When constructed as herein described, an automobile radio receiver may be selected and purchased because of its own merits as such, and the purchaser may himself properly install it, without interfering with the proper operation of the radio apparatus as designed and adjusted by the radio manufacturer, and without interfering with the arrangement of the automobile controlling devices and proper operation of the car as designed by the automobile manufacturer, and he may later remove it, without leaving unsightly evidence of its installation, and transfer it to another car of the same or different make or model.

In the drawings—

Figure 1 is a fore-and-aft vertical sectional view taken through the instrument panel of an automobile, showing in left side elevation the steering wheel end-portion of the steering column of the car, with the two casings of the radio apparatus embodying my invention supported thereupon, and illustrating in full and dotted lines two of the many positions in which said casings may be adjustably secured;

Figure 6 is an inverted bottom view, outlining the two casings in the positions shown in Fig. 1 and illustrating in dotted lines one method of arranging the principal elements of the radio receiving apparatus in said casings;

Figure 1:
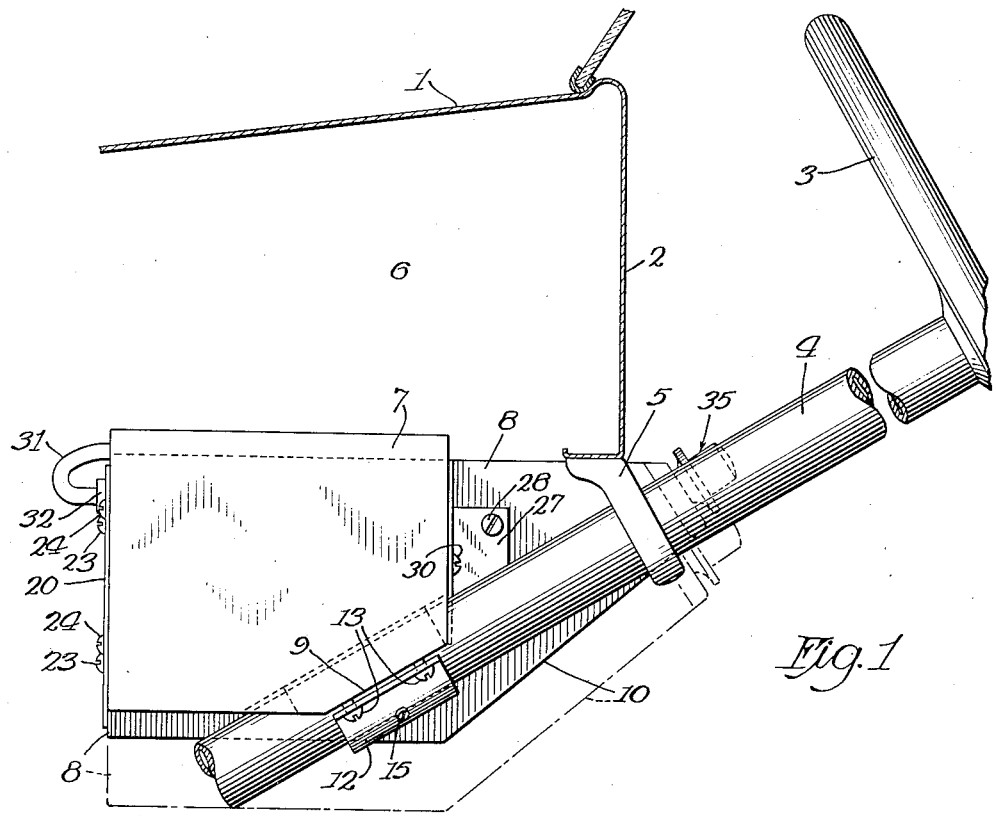
Figure 2:
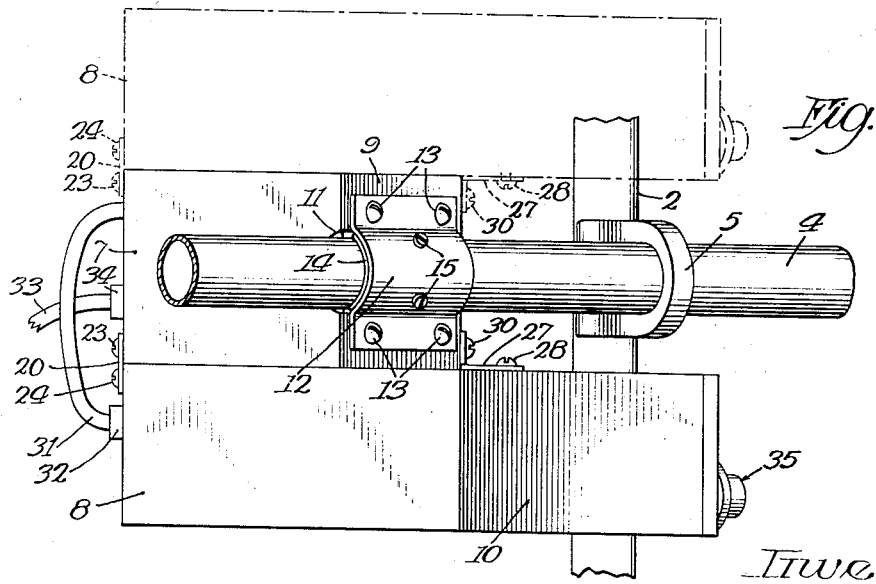
Figure 2 is an inverted bottom view of the elements shown in Fig. 1, parts being broken away, illustrating in full lines the two casings arranged as shown in Fig. 1 and in dotted lines an alternative arrangement thereof.

Figure 7 is a fore-and-aft vertical sectional view taken through the instrument panel of an automobile of different make from the one illustrated in Fig. 1, showing in right side elevation the steering wheel end-portion of the steering column and gear-shifting control-lever of the car, with the two casings of the radio apparatus embodying my invention supported upon said steering column in a somewhat different manner from the arrangement of the preceding figures of the drawings; and Figure 8 is a fragmentary sectional view, taken upon the line 8—8 of Fig. 7.

The present invention is not concerned with any particular radio receiving circuit nor with any specific arrangement of the different elements of the radio receiving apparatus in the casings shown, nor is it concerned with the construction or placement of the loud-speaker unit. Consequently, the loud-speaker unit has not been shown, and it is to be understood that the arrangement of the elements of the radio apparatus in the two casings may be varied as desired from that indicated in Fig. 6 of the accompanying drawings. It may be mentioned, however, that the heavier and more sturdily constructed elements are preferably located and properly distributed according to their weight in the casing which is directly supported upon the fixed supporting means, while the lighter and more delicate elements are located where they will be subjected to a minimum amount of jarring shocks from the travel of the car. While these are important considerations which have to do with the desirability of the arrangement and supporting of the casings to be described, I do not wish to be limited to any specific disposal of the various elements in their respective casings.

Figures 3, 4:
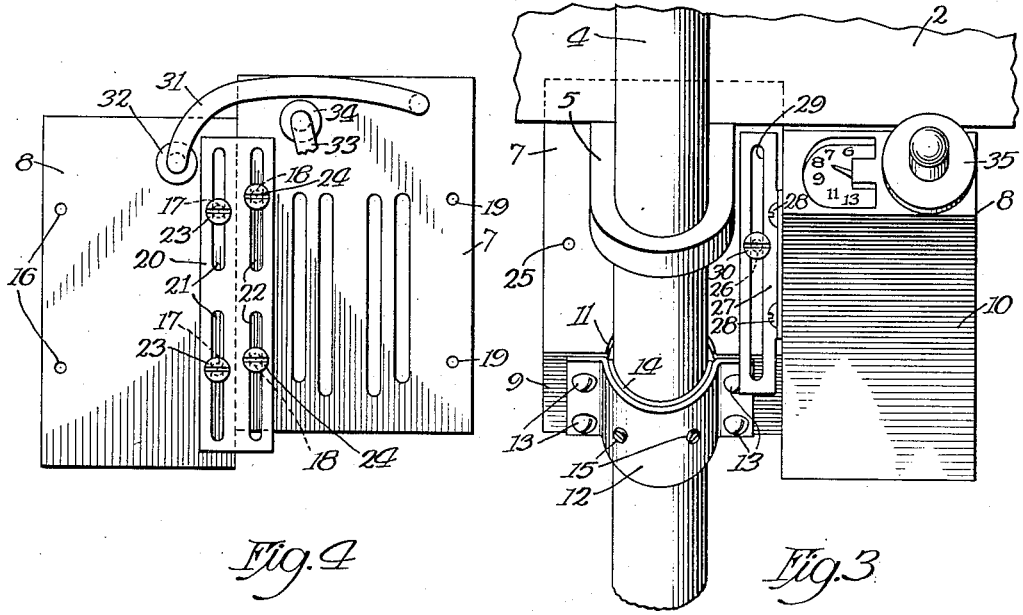
Figure 3 is a fragmentary front elevational view of the two casings arranged as shown in Fig. 1.
Figure 4 is a rear elevational view of the two casings arranged as shown in Fig. 1.

Referring, first, to Figures 1, 3 and 7 of the accompanying drawings, 1 indicates the cowling or rearward part of the hood of an automobile, 2 the instrument panel thereof, 3 the steering wheel, 4 the steering column, and 5 the eye-bracket securing the steering column and instrument panel together. As is well known, the general arrangement of these parts is substantially the same in nearly all standard makes of automobiles, but the slant of the steering column and the number and arrangement of the automobile controlling and indicating devices in the instrument panels of different makes of cars vary greatly, as does also the utilization of the space, indicated at 6, below the cowling directly forward of said panels. It is to be noted that the casings 7 and 8 do not encroach materially upon this space.

The two casings 7 and 8 are rectangular, with the exception of the rearwardly presented parts of their lower faces, which are slanted downwardly and forwardly, as at 9 and 10, respectively, to afford knee-room for the operator and to avoid obstructing his observation and operation of the automobile pedal-controls. The slanted face 9 of casing 7 is formed with a semi-cylindrical channel 11, which extends downwardly midway of said face and, in the installation illustrated in Figs. 1 to 4, inclusive, serves as a saddle for the steering column 4, astride which casing 7 is firmly clamped by the saddle-clip 12. Saddle-clip 12 is removably secured to face 9 by four screws 13, and a bushing 14 of fibre or other suitable material is preferably employed to permit the casing 7 to be tightly clamped in position without marring the finish of the steering column 4. Obviously, bushing material of different thicknesses may be used as a filler to adapt the channel 11 and the saddle-clip 12 for steering columns of different diameters. One or more pointed set-screws 15 are threaded through saddle-clip 12 and project through holes in bushing 14 to serve as circuit-grounding contacts with the steering column. Screws 13 are not fully tightened and set-screws 15 are not turned into contact with the steering column until the casings 7 and 8 have been adjusted with respect to each other and are in their respective desired positions.

Figure 5:
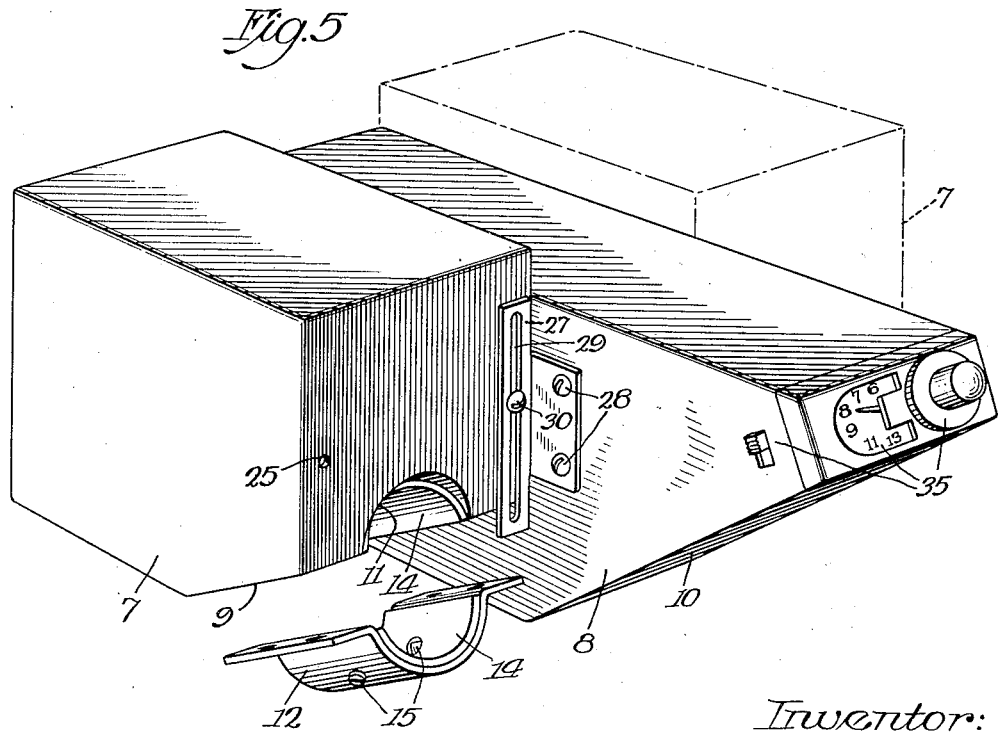
Figure 5 is a perspective view of the two casings, illustrating in full lines the relative arrangement thereof as shown in the preceding figures of the drawings, and in dotted lines the alternative arrangement thereof as shown in dotted lines in Fig. 2.

Provision is made for adjustably supporting casing 8 upon either side of casing 7 and, therefore, to the right or left of the steering column, as may be preferred by the operator or for other reasons. The right-hand arrangement shown in full lines in the drawings (Figs. 1 to 4) will first be described, but it will be observed (Figs. 3 and 4) that complemental sets of threaded screw-holes are provided, so that the same screws and slotted plates may be employed for either right or left arrangement of casing 8 with respect to casing 7. The left-hand arrangement is shown in Figure 7 and indicated in dotted lines in Figures 2 and 5.

While the scope of my invention is of course not limited to the relative sizes of the two casings 7 and 8 herein shown, it will be seen from the drawings that, in the preferred construction therein illustrated, the fore-and-aft length of casing 8 is considerably greater than that of casing 7 so that, when the two casings are in their proper side-by-side arrangement, with their forward ends flush, casing 8 extends rearwardly toward the operator quite a distance beyond the rearward end of casing 7 and the point of its support upon the steering column. The point of support upon the steering column is shown to be fairly centralized with respect to casing 8, and the radio controlling devices 35 at the upper rearward end-part of casing 8 may thus be presented for convenient operation just below the instrument panel 2, while the casings themselves are positioned almost wholly above the plane of the steering column and below the space 6 forward of the instrument panel, out of the way of the operator and leaving the space 6 free for utilization for other purposes desired by the automobile manufacturer.

The forward ends of the two casings are provided, near each vertical side thereof, with pairs of threaded screw-holes 16, 17, 18 and 19 (Figure 4), and these ends of the casings are connected together to permit relative vertical adjustment by the single slotted plate 20, the parallel pairs of vertically extending slots 21 and 22 of which accommodate corresponding pairs of screws 23 and 24, shown in Figure 4 as occupying the pairs of screw-holes 17 and 18.

The rearward end of casing 7 is provided, near the vertical sides thereof, with threaded screw-holes 25 and 26. The slotted angle-plate 27 is removably secured to the side of casing 8 by screws 28, and the vertically extending slot 29 in said angle-plate accommodates a screw 30, which is shown occupying the screw-hole 26. Complemental pairs of threaded screw-holes for screws 28 are provided upon each side of casing 8, so that, for the left-hand arrangement of casing 8, as shown in Figures 7 and 8, angle-plate 27 may be secured upon the right side of said casing and screw 30 may be transferred to the screw-hole 25 in casing 7.

Circuit connections between the proper radio elements in casings 7 and 8 are effected through the cable 31 and plug-and-socket connections 32 and with the loud-speaker unit (not shown) through the cable 33 and plug-and-socket connections 34, when the casings have been finally adjusted and fixed in their respective positions.

Installation of the radio receiving apparatus in each of the arrangements illustrated may be easily and quickly accomplished. The two casings 7 and 8 are first attached together in right or left hand arrangement, as may be desired, by means of the slotted plates 20 and 27 and the respective screws, and casing 7 is placed in position upon the steering column 4 so that the radio controlling devices 35 at the upper rearwardly presented end-part of casing 8 are positioned in the desired vertical plane.

Where the casing 7 may be placed with channel 11 resting directly upon the steering column 4, as shown in Figures 1 to 4, saddle-clip 12 is then attached to face 9 and the screws 13 are turned in sufficiently to hold the casings temporarily in place upon the steering column. Casing 8 is then moved upwardly to the desired position, shown in the drawings as just below the instrument panel 2 of the car, and the screws 16 to 19 and 30, inclusive, are turned in sufficiently to hold the two casings temporarily in their desired relative positions. When the casings are satisfactorily positioned, the several screws 16 to 19 and 30, inclusive, are firmly tightened. The plug-and-socket connections 32 and 34 are then made and set-screws 15 are turned in to contact with the steering column, and the installation is complete.

In the installation illustrated in Figures 7 and 8, the presence of the automobile gear-shift-rod 36 upon and along the steering column prevents the use of channel 11 of casing 7 as a saddle for the steering column, and a two-piece cylindrically shaped sleeve 37 is substituted for the previously described saddle-clip 12. As will be seen in Figure 8, channel 11 straddles the gear-shift-rod 36, the two sections 38 and 39 of sleeve 37 are secured to casing 7 by the same screws 13 previously mentioned, and are connected together by clamping bolts 40. In making an installation of this character, the sections 38 and 39 are placed around the steering column, fastened together by bolts 40, and screwed to casing 7 by screws 13. When the casings have been properly positioned, the aforesaid bolts and screws are tightened, and the pointed set-screws 15 are turned in as previously described to effect circuit-grounding contact with the steering column.

It has been mentioned that the heavier and more sturdily constructed elements of the radio receiving apparatus are preferably located and properly distributed according to their weight in the casing which is directly supported upon the fixed supporting means. This has reference to the location of such parts as the power and output transformers, vibrator, etc., in the casing 7, and their distribution therein with respect to the channel 11 to more or less equalize the weight of the unit upon opposite sides of the steering column and thereby avoid or minimize twisting strain upon the clamp connection therewith. Similarly, the reference to the location of the lighter and more delicate elements where they will be subjected to a minimum amount of jarring shocks from the travel of the car relates to arrangement of such parts as the amplifying tubes, variable tuning condenser, and adjustable controlling devices 35 in the casing 8, which is secured only to and at one or the other side of casing 7.

Having fully described the purposes of my invention and the construction herein shown in which it is embodied, I claim:

1. In combination with the steering column of an automobile, radio receiving apparatus comprising first and second separate casings each housing elements of said apparatus, clamping means holding said first casing upon and across said steering column in a desired position therealong, and means holding said second casing upon and selectively at either side of said first casing and permitting its adjustment vertically with respect thereto at either side of said steering column.

2. In combination with the steering column and instrument panel of an automobile, radio receiving apparatus comprising first and second separate casings each housing elements of said apparatus, clamping means holding said first casing upon and across said steering column and permitting its adjustment therealong toward and from said instrument panel, and means holding said second casing upon and selectively at either side of said first casing and permitting its adjustment with respect thereto at either side of said steering column, whereby a fore-and-aft adjustment of said apparatus with respect to said instrument panel may be effected through the positioning of said first casing along said steering column, and an up-and-down adjustment of said apparatus with respect to said instrument panel may be effected through the positioning of said first casing along said steering column and through the positioning of said second casing upon said first casing.

3. In combination with a slanting cylindrical support, radio receiving apparatus comprising first and second separate casings each housing elements of said apparatus and having bottom and vertical walls, said first casing also having a slanting wall, a semi-cylindrical channel formed in the slanting wall of said first casing and a semi-cylindrical clamping plate removably secure to said slanting wall to cooperate with the channel formed therein to surround said cylindrical support and hold said first casing adjustably positioned thereupon and thereacross, and slotted plates secured to two of the vertical walls of each of said casings holding said casings together in adjustable side-by-side arrangement.

4. In combination with the slanting steering column and transversely extending instrument panel of an automobile, radio receiving apparatus of the character described comprising first and second separate casings each housing elements of said apparatus and having bottom and vertical walls, each of said casings also having a slanting wall, clamping means secured to the slanting wall of said first casing and holding it adjustably upon and across said steering column, manually adjustable radio controlling devices arranged in said second casing above the slanting wall thereof, and means adjustably securing said casings to each other to permit relative adjustment thereof, the adjustment of said first casing upon said steering column and the adjustment of said casings with respect to each other permitting the location of said manually adjustable radio controlling devices in the desired position with respect to said instrument panel.

OTTO E. WAGENKNECHT.